United States Patent [19]

Irving et al.

[11] Patent Number: 5,221,709

[45] Date of Patent: Jun. 22, 1993

[54] SEALING COMPOSITION AND A MINERAL INSULATED ELECTRIC CABLE TERMINATION EMPLOYING SUCH COMPOSITION

[75] Inventors: Brian A. Irving; Robert J. W. Powell, both of Middlesex, England

[73] Assignee: Associated Electrical Industries Limited, England

[21] Appl. No.: 773,111

[22] Filed: Oct. 8, 1991

[30] Foreign Application Priority Data

Oct. 17, 1990 [GB] United Kingdom ............... 9022586

[51] Int. Cl.⁵ .................. C08L 27/18; C08K 5/06
[52] U.S. Cl. .......................... 524/520; 524/611; 524/492; 524/493; 524/448; 524/370; 524/367; 523/173
[58] Field of Search ............ 524/520, 611, 492, 493, 524/448, 367, 370; 523/173

[56] References Cited

U.S. PATENT DOCUMENTS

| | | | |
|---|---|---|---|
| 3,773,705 | 11/1973 | Wicker | 524/452 |
| 3,845,233 | 10/1974 | Burton | 174/24 |
| 3,969,309 | 7/1976 | Wright | 260/37 SB |
| 4,096,117 | 6/1978 | Anderson | 524/611 |
| 4,478,970 | 10/1984 | Abolins et al. | 524/611 |
| 4,483,958 | 11/1984 | Kosaka et al. | 524/448 |
| 5,075,365 | 12/1991 | Wallbillich | 524/546 |

FOREIGN PATENT DOCUMENTS

| | | |
|---|---|---|
| 0334542 | 9/1989 | European Pat. Off. |
| 0420245 | 4/1991 | European Pat. Off. |
| WO8603329 | 6/1986 | PCT Int'l Appl. |
| 1288370 | 9/1972 | United Kingdom |
| 2167084 | 5/1986 | United Kingdom |
| 2178606 | 2/1987 | United Kingdom |

OTHER PUBLICATIONS

Chem. Abstracts, vol. 105, No. 8, Apr. 19, 1986, Abstract No. 63759M. T. Toshiaki, "Fuel Cell".
World Patents Index Latest, Week 8702, Dec. 1, 1986, Derwent Publications, Ltd., AN 87–012229/02 & JP A-61 271 349 (Shinetsu Chem Ind. KK) Abstract.
Chemical Abstracts, vol. 110, No. 6, Aug. 3, 1988, Abstract No. 42046Q, T. Mitsunaga, "Electrolyte retaining peripheral seals for fuel-cell electrodes", Astract, & JP-A-63 575 (Mitsubishi Electric Corp.).

Primary Examiner—Paul R. Michl
Assistant Examiner—LaVonda DeWitt
Attorney, Agent, or Firm—Kirschstein, Ottinger, Israel & Schiffmiller

[57] ABSTRACT

This invention relates to a sealing composition for a mineral insulated electric cable termination. The sealing composition includes an inert filler such as silica flour, a low vapor pressure organic material such as a polyphenyl ether and an aerosil. This composition has improved slump resistance at high temperatures with little run out and no tendency to crack at 250° C.

6 Claims, No Drawings

SEALING COMPOSITION AND A MINERAL INSULATED ELECTRIC CABLE TERMINATION EMPLOYING SUCH COMPOSITION

BACKGROUND OF THE INVENTION

1. Field of the Invention

This invention relates to a sealing composition and a mineral insulated electric cable termination employing such a composition.

2. Description of Related Art

Such terminations typically comprise a hollow cylindrical pot consisting of a metal, typically brass, into which the end of the cable to be terminated extends via an aperture in one end of the pot, the aperture being threaded so that the pot may be screwed onto the outer sheath of the cable. Prior to fitting the pot the insulation round the conductors of the cable is stripped away so that from just inside the pot to the cable end the conductors are bare. The space within the pot not occupied by the conductors is filled with a sealing composition and the ends of the conductors pass through holes in an insert of a polymeric material which fits into the other end of the pot which is crimped over the edge of the insert to secure it in position. A sleeve is then normally fitted over the ends of the bare conductors which protrude through the insert, the sleeve fitting over nipples formed on the outer surface of the insert around the holes for the conductors.

SUMMARY OF THE INVENTION

It is an object of the present invention to provide an improved sealing composition for use in mineral insulated cable termination.

According to the present invention there is provided a sealing composition including an inert solid filler and a low vapour pressure organic material selected from a group consisting of a polyphenyl ether and a fluorinated polyether.

Preferably the inert filler is a crushed quartz filler (silica flour) or polytetrafluorethylene.

The polyphenyl ether (PPE) may be a 5 ring or 6 ring polyphenyl ether.

DETAILED DESCRIPTION OF THE PREFERRED EMBODIMENTS

Preferably the inert filler and 5 ring or 6 ring PPE are added in a ratio of 1.4 to 1 by weight. A mixture including 14 grams of silica flour and 10 grams of 5 ring or 6 ring PPE provided a high temperature slump resistant composition from which there was little run out and no tendency to crack at 170° C. A 5 ring PPE composition with aerosil but without the inert filler formed too rigid gel at high temperatures which allowed cracks to form and which in turn gave electrical leakage.

Preferably the composition of the present invention further includes a fumed silica such as an aerosil.

The composition may include 39 to 54% by weight PPE such as 6 ring PPE, 45 to 60% by weight silica flour and 0.2 to 1% by weight aerosil.

Preferably the composition embodying the present invention includes 44% by weight 6 ring PPE, 55.6% by weight silica flour and 0.4% by weight aerosil. This composition has improved slump resistance at high temperatures with little run out and no tendency to crack at 250° C. Further this composition represents about 70% by volume of PPE. If figures for loss of PPE by evaporation from a termination over 30 years are applied to this composition then at the end of 30 years the PPE content would still be greater than 42% by weight and thus it would not affect the material properties.

A composition including 6 ring PPE and 4% aerosil but without the inert filler resulted in stiff cracked gel with noticeable run out of PPE at 250° C. A composition including 6 ring PPE with up to 6% aerosil but without the inert filler gave stiffer high temperature gel, and showed a tendency to crack at 170° C.

The sealing composition of the present invention is suitable for use in applications where satisfactory performance at higher temperatures is required and where abnormal environments such as organic vapour laden atmospheres and/or radioactive environments may be encountered in nuclear power stations.

The invention also provides a termination for a mineral insulated cable comprising a hollow cylindrical metal pot into which one end of the cable extends via an aperture in one end of the pot, the cable having at least one conductor which is stripped of insulation from just within the pot, an insert of a plastics material secured in the other end of the pot and a mass of sealing composition according to the invention filling at least the space within the pot not occupied by the conductor or conductors.

The sealing composition may fill the whole of the available space within the pot. Alternatively, a plug of inert material may be arranged in the pot, the remaining available space within the pot then being filled with the sealing composition. For solvent resistance the plug suitably consists of a polymeric material such as polypropylene or where solvent resistance is required for higher temperature or radiation resistance, of a ceramic material.

In a termination embodying the invention the insert and plug, if present consist of a filled polyimide or an asbestos substitute based material where high temperature or radiation resistance is required. Alternatively, where solvent resistance is required the insert and plug, if present may consist of a polyproplene or a fluorinated polymer material.

Preferably the termination embodying the invention also includes a sleeve fitted over the end of the or each conductor which extends through the insert. The sleeve suitably consists of a polyethylene, a polypropylene or a fluorinated polymer material, where solvent resistance is required, or a woven glass fibre material impregnated with silicone or polyimide where high temperature or radiation resistance is required.

We claim:

1. A sealing composition for use in mineral insulated cable terminations, comprising: an inert solid filler and a low vapour pressure organic material selected from a group consisting of a five-ring polyphenyl ether and a six-ring polyphenyl ether.

2. A composition as claimed in claim 1, in which the inert filler is selected from a group consisting of a crushed quartz filler and polytetrafluoroethylene.

3. A composition as claimed in claim 1, in which the ratio by weight of the polyphenyl ether to the filler is 1 to 1.4.

4. A composition as claimed in claim 1, further including a fumed silica such as aerosil.

5. A composition as claimed in claim 4, including 39 to 54% by weight PPE such as 6 ring PPE, 45 to 60% by weight silica flour and 0.2 to 1% by weight aerosil.

6. A composition as claimed in claim 4, including 44% by weight 6 ring PPE, 55.6% by weight silica flour and 0.4% by weight aerosil.

* * * * *